US006209015B1

(12) United States Patent
Jhung

(10) Patent No.: US 6,209,015 B1
(45) Date of Patent: Mar. 27, 2001

(54) METHOD OF IMPLEMENTING DUAL-MODE AUDIO DECORDER AND FILTER THEREFOR

(75) Inventor: Yon-Hong Jhung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/634,234

(22) Filed: Aug. 8, 2000

Related U.S. Application Data

(62) Division of application No. 08/975,181, filed on Nov. 20, 1997.

(30) Foreign Application Priority Data

| | | |
|---|---|---|
| Nov. 20, 1996 | (KR) | 96-55725 |
| Nov. 20, 1996 | (KR) | 96-55726 |
| Nov. 27, 1996 | (KR) | 96-58349 |
| May 21, 1997 | (KR) | 97-19852 |

(51) Int. Cl.[7] .............................. G06F 17/14; G10L 3/02
(52) U.S. Cl. .............................. 708/402; 704/204
(58) Field of Search .............................. 708/400, 402; 704/203–204

(56) References Cited

U.S. PATENT DOCUMENTS

| | | | | |
|---|---|---|---|---|
| 5,349,549 | * | 9/1994 | Tsutsui | 708/402 |
| 5,640,421 | * | 6/1997 | Sonohara et al. | 708/402 |
| 5,737,717 | * | 4/1998 | Akagiri et al. | 704/204 |
| 5,819,211 | * | 10/1998 | Jeong | 704/204 |
| 5,901,234 | * | 5/1999 | Sonohara et al. | 704/204 |
| 5,970,461 | * | 10/1999 | Chatterton | 704/204 |

* cited by examiner

*Primary Examiner*—Tan V. Mai
(74) *Attorney, Agent, or Firm*—Marger Johnson & McCollom, P.C.

(57) ABSTRACT

A method of implementing a dual-mode audio decoder and filter is provided. The inverse modified discrete cosine transform (IMDCT) method and circuit for a dual-mode audio decoder perform the IMDCT with respect to a signal encoded using either the MPEG or Dolby AC-3 standard by utilizing a shared fast Fourier transform (FFT) circuit thereby simplifying the necessary hardware construction. Also, the number of IMDCT outputs used for windowing is reduced by utilizing the properties of the IMDCT outputs of the MPEG bit stream and thus the size of memory necessary for storing the IMDCT outputs is reduced.

5 Claims, 9 Drawing Sheets

METHOD OF IMPLEMENTING DUAL-MODE AUDIO DECORDER AND FILTER THEREFOR

This is a division of U.S. patent application No. 08/975,181 filed on Nov. 20, 1997.

BACKGROUND OF THE INVENTION

1. Field of the Invention

The present invention relates generally to an audio decoder. In particular, the present invention relates to a method and circuit for implementing a dual-mode audio decoder which performs an inverse modified discrete cosine transform (IMDCT) on a signal encoded using the Moving Picture Experts Group (MPEG) standard and the Dolby® AC-3 standard. The IMDCT transform is performed using a common Fast Fourier Transform (FFT) circuit. The audio decoder reduces the size of necessary memory by reducing the number of IMDCT outputs used in windowing and by utilizing the properties of the IMDCT outputs.

2. Description of the Related Art

As the processing of digital audio has increased in the video and multimedia fields, so has the demand for effective compression algorithms. Effective compression algorithms are necessary because digital audio occupies a considerable portion of the signal bandwidth. Representative compression algorithms are MPEG and Dolby AC-3. The MPEG compression algorithm is the first international audio compression standard. According to the MPEG standard, effective compression can be obtained utilizing the human psychoacoustic recognition characteristic which responds differently depending on the frequency band. The AC-3 standard was adopted as the audio standard for North American High-Definition Television (HDTV) systems. The AC-3 standard has recently been applied to Digital Video Disk (DVD), Direct Broadcasting System (DBS), Set Top Box (STB), digital cable, etc. The AC-3 compression algorithm also uses the human psychoacoustic characteristic as a basis for audio compression. Both the MPEG and AC-3 standards are not limited to specific types of input signals and thus can be used for compressing speech, high-quality audio signals, and the like.

Recently, dual-mode audio decoders capable of decoding both the AC-3 audio stream and MPEG audio stream have been designed and introduced into the marketplace. To achieve such dual-mode audio decoders, it is necessary to unify the hardware blocks of the two audio standards. An audio decoder may be divided into a bit-allocation component and a reconstruction filter component for restoring a time-domain signal. Practically, the bit-allocation component for the MPEG standard is quite different from the bit allocation component of the AC-3 standard. Thus it is almost impossible to design bit allocation blocks having the same function as the MPEG-specific and AC-3-specific bit-allocation components. In contrast, the reconstruction filter components have similar functional blocks including inverse transform blocks, widow blocks, and overlap and add blocks. The inverse transform blocks of MPEG and AC-3 are particularly suited for combination by properly modifying different transform equations adopted in the MPEG and AC-3 standards. Specifically, the MPEG and AC-3 standards adopt a subband structure which is efficient in processing audio signals. The subband structure of the MPEG and AC-3 standards are discussed in detail in P. P. Vaidyanathan, MULTIRATE SYSTEMS AND FILTER BANKS, Prentice Hall (1993) which is incorporated herein by reference. The frequency characteristic of each subband is expressed by a simple transform equation termed IMDCT. The IMDCT transform is discussed in further detail in J. P. Prinven and A. B. Bradley, *Analysis/synthesis filter bank design based on time domain aliasing cancellation,* IEEE Trans. Assp-34, Vol. No. 5, 1153–61 (October 1986). The AC-3 standard supports three kinds of transform equations. One of the three transform equations is selected at the encoding stage according to the input signal characteristics. Thereafter, the selected transform equation is manipulated so that the FFT structure reduces the amount of computation. The MPEG standard, on the other hand, uses one transform equation which is different from the three types of AC-3 transform equations. Although the IMDCT of the MPEG standard is different from the IMDCT of the AC-3 standard, the IMDCT of the MPEG standard becomes the subset of the IMDCT of the AC-3 standard when the FFT is used. Accordingly, it is preferable to implement a dual-mode audio decoder which has an IMDCT circuit based on the same FFT structure. By doing so, the FFT structure can be shared by the MPEG and AC-3 specific components thereby reducing the overall decoder cost.

At the same time, a conventional IMDCT windowing method outputting MPEG data can be used with a more efficient memory structure since all 64 IMDCT outputs need not be simultaneously stored in memory.

SUMMARY OF THE INVENTION

It is an object of the present invention to provide a method and circuit for dual-mode audio decoding which overcomes the disadvantages associated with prior art dual-mode decoders.

It is another object of the present invention to provide a method for a dual-mode audio decoding which performs the IMDCT transform of an MPEG file using the FFT transform of the IMDCT component of the AC-3 specific hardware.

It is yet another object of the present invention to provide an IMDCT circuit for a dual-mode audio decoder which can implement the IMDCT transform of the MPEG standard using the FFT transform of the AC-3 standard.

It is still another object of the present invention to provide a windowing method for a dual-mode audio decoder which can reduce the size of a memory for storing IMDCT outputs according to MPEG IMDCT output characteristics.

In one aspect of the present invention, there is provided an IMDCT method for a dual-mode audio decoder, comprising receiving a bit stream and identifying the received bit stream as an AC-3 bit stream or an MPEG bit stream. If an AC-3 bit stream is received, an AC-3 sequence is formed and then multiplied by a predetermined pre-twiddling factor. The pre-twiddled AC-3 sequence is then fast Fourier transformed and then multiplied by a predetermined post-twiddling factor. If an MPEG bit stream is received, an MPEG sequence is formed, fast Fourier transformed, multiplied by a predetermined twiddling factor, and rearranged.

In another aspect of the present invention, there is provided an IMDCT circuit for a dual-mode audio decoder, comprising first storage means for storing AC-3 and MPEG bit streams and IMDCT AC-3 and MPEG output signals. A butterfly module is coupled to the first storage means for Fourier transforming the AC-3 and MPEG bit streams. A ROM is coupled to the butterfly module for storing Fourier transform coefficient values. A second storage and thid storage means are also included. The second storage means stores the AC-3 and the MPEG bit streams and the real parts of the AC-3 and MPEG sequences. The third storage means stores the imaginary parts of the AC-3 and MPEG sequences. An address generating means generates addresses for the first, second, and third storage means and the ROM. A state machine is coupled to the butterfly module, the address generator, and the first and second storage means for generating control signals for controlling the butterfly module, the address generator, and the first and second storage means.

BRIEF DESCRIPTION OF THE DRAWINGS

The above objects, other features, and advantages of the present invention will become more apparent by describing the preferred embodiments thereof with reference to the accompanying drawings, in which.

DETAILED DESCRIPTION OF THE PREFERRED EMBODIMENTS

Figure 1:
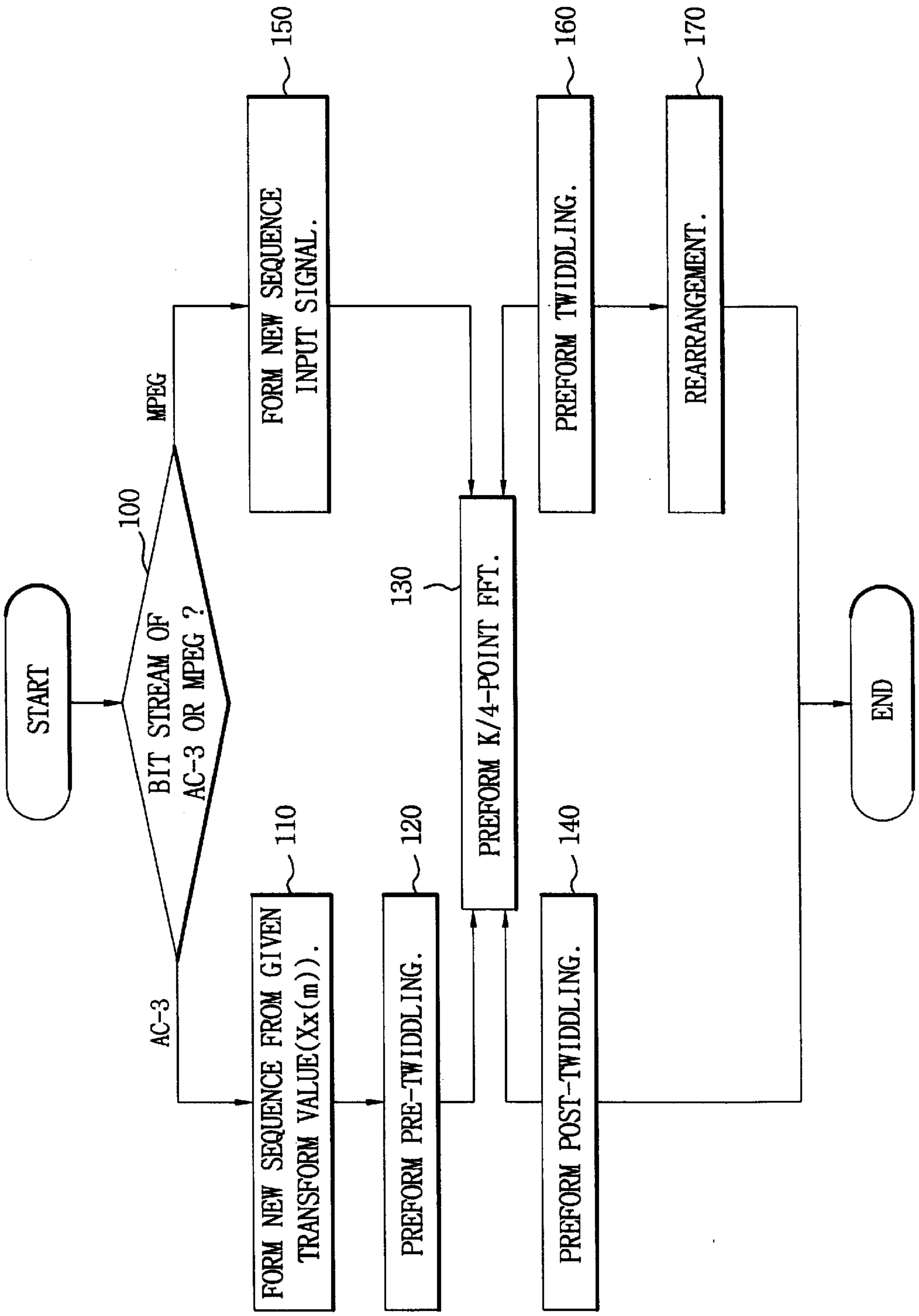
FIG. 1 is a flow chart of the IMDCT method for a dual-mode audio decoding according to the present invention.

Modification of the Dolby AC-3 IMDCT method will be explained first followed by an explanation of the modification of the MPEG IMDCT method.

1) The Dolby AC-3 IMDCT method

The Dolby AC-3 standard utilizes three kinds of transforms as mentioned above. If an input signal has no abrupt transition in amplitude and frequency in a unit time domain a so-called long transform is used. If, on the other hand, a transition of the input signal is produced within a unit time domain, two short transforms are used to compensate for the inaccuracy at the transition point produced when the long transform is used. The IMDCT of the AC-3 standard is expressed as equation 1a. Equation 1a represents the three kinds of transforms used in the AC-3 standard.

$$X_D(k) = -\frac{2}{K}\sum_{r=0}^{N-1} g_m(r)\cos\left(\frac{2\pi}{4K}(2r+1)(2k+1)+\frac{\pi}{4}(2k+1)(1+\alpha)\right) \quad \text{Equation 1a}$$

Where:

- D denotes the type of block switch or transform;
- N equals 512 for a long transform and 256 for a short transform;
- $g_m(r)$ denotes values obtained by multiplying the input signal by analysis window coefficients K is greater than or equal to zero and less than or equal to K/2−1; and
- α is equal to −1 for a first short transform, 0 for a long transform, and 1 for second short transform.

Accordingly, the IMDCT transform of the AC-3 standard is defined in equation 1b.

$$x(r) = -\sum_{r=0}^{K/2-1} X_D(K)\cos\left(\frac{2\pi}{4K}(2r+1)(2k+1)+\frac{\pi}{4}(2k+1)(1+\alpha)\right) \quad \text{Equation 1b}$$

The cosine term of the transform given in equation la is not a full ranked matrix. Thus, the inverse transform cannot be directly obtained by obtaining the inverse of the forward transform. Rather, the inverse transform is defined as a by-product during the full implementation process.

The modification of the IMDCT for long transform is as follows.

$$X_k(m) = \sum_{r=0}^{K-1} g_m(r)\cos\left(\frac{2\pi(2r+1)(2k+1)}{4K}+\frac{\pi(2k+1)}{4}\right) \quad \text{Equation 1c}$$

For computational convenience, the term "−2/K" in equation 1*a is ignored.*

$$X^{\frac{K}{2}2k-1}(m) + jX_{2k}(m) = (-1)^k e^{j\frac{\pi}{4}} e^{-j\frac{2\pi(8k+1)}{8K}} \sum_{r=0}^{K/4-1}\left\{z_m(r)e^{-j\frac{2\pi(8r+1)}{8K}}\right\} e^{-j\frac{2\pi kp}{K/4}} \quad \text{Equation 1d}$$

At this time, the relational expression $z_m(r)=\{(g_1-g'_2)+j(-g_2-g'_1)\}$ is realized. Equation 1d represents that $$X^{\frac{K}{2}2k-1}(m) + jX_{2k}(m),$$

defined as the new sequence, is given by a Discrete Fourier Transform (DFT) of $z_m(r)$ with scale factors. Accordingly, it is understood that restoring $z_m(r)$ is possible through the inverse DFT of the new sequence and including a series of scale factors.

The method of restoring the signal $z_m(r)$ in the time domain from the signal $X_k(m)$ in the frequency domain using an Inverse Fast Fourier Transform (IFFT) for a "long transform" will now be explained.

The method of performing the IMDCT transform of the AC-3 standard is summarized as follows:

at step 1, the signal $$X^{\frac{K}{2}2k-1}(m) + jX_{2k}(m)$$

of the new sequence is formed from the signal $X_k(m)$ in the frequency domain, where k=0, 1, . . . , 255 and K=512;

at step 2, the signal $$X^{\frac{K}{2}2k-1}(m) + jX_{2k}(m)$$

of the new sequence is multiplied by $$e^{j\frac{2\pi(8k+1)}{8K}};$$

at step 3, a K/4-point IFFT is performed of the signal resulting from step 2; and at step 4, the signal resulting from step 3 is multiplied by $$e^{j\frac{2\pi(8r+1)}{8K}}.$$

Next, the two short transforms are explained in relation to equation 1d. The IMDCT modification of the short transform with respect to the first block (256 samples) is as follows. In the case of short transform, equation 1a is given by equation 1e.

$$X_k(m) = -\frac{2}{K}\sum_{r=0}^{K-1} g_m(r)\cos\left\{\frac{2\pi}{K}\left(k+\frac{1}{2}\right)\left(r+\frac{1}{2}\right)\right\} \qquad \text{Equation 1e}$$

In the same manner as the long transform, the odd-numbered sequence and even-numbered sequence of $X_k(m)$ are derived to define the new sequence.

The new sequence is derived as follows:

$$X^{\frac{K}{2}2k-1}(m) + jX_{2k}(m) = \sum_{r=0}^{K/4-1}\left[\left\{fm(r)e^{-j\frac{2\pi(8r+1)}{8K}}\right\}e^{j\frac{2\pi kr}{K/4}}\right]e^{-j\frac{2\pi(8k+1)}{8K}} \qquad \text{Equation 1f}$$

where $Z_{fm}(r)=\{(g_1-g'_2)+j(g_1-g_2)\}$. Equation 1f indicates that the new sequence can be express in terms of DFT.

Thus, the method for computing the inverse transform is summarized as follows:

at step 1, form a new sequence $$X^{\frac{K}{2}2k-1}(m) + jX_{2k}(m)$$

with given transform coefficients $X_K(m)$ for [k=0, 2, 4, . . . 126];

at step 2, the new sequence $$X^{\frac{K}{2}2k-1}(m) + jX_{2k}(m)$$

is multiplied by $$e^{j\frac{2\pi(8k+1)}{8K}};$$

at step 3, a K/4-point IFFT is performed of the signal resulting from step 2; and at step 4, the signal resulting from step 3 is multiplied by $$e^{j\frac{2\pi(8k+1)}{8K}}.$$

The IMDCT modification of the short transform with respect to the second block (256 samples) is as follows. In case of the short transform of the second block, equation 1a is given by equation 1g.

$$X_{k(m)} = -\frac{2}{K}\sum_{r=0}^{K-1} g_m(r)\cos\left\{\frac{2\pi(2k+1)(2r+1)}{4K}+\frac{\pi}{2}(2k+1)\right\} \qquad \text{Equation 1g}$$

In the same manner as the long transform, the odd-numbered sequence and the even-numbered sequence of $X_k(m)$ are derived to define the new sequence.

The new sequence is derived as follows:

$$X^{\frac{K}{2}2k-1}(m) + jX_{2k}(m) = \sum_{r=0}^{K/4-1}\left[\left\{s_m(r)e^{-j2\frac{\pi(8r+1)}{8K}}\right\}e^{j2\pi\frac{kr}{K/4}}\right]e^{-j2\frac{\pi(8k+1)}{8K}} \qquad \text{Equation 1h}$$

The method for computing the inverse transform is summarized as follows:

at step 1, the new sequence $$X^{\frac{K}{2}2k-1}(m) + jX_{2k}(m)$$

is formed from the signal $X_k(m)$ in the frequency domain, where k=1, 3, 5, . . . 127 and K=256;

at step 2, the signal $$X^{\frac{K}{2}2k-1}(m) + jX_{2k}(m)$$

of the new sequence is multiplied by $$e^{j\frac{2\pi(8k+1)}{8K}};$$

at step 3, a K/4-point IFFT is performed with respect to the signal resulting from step 2; and at step 4, the signal resulting from step 3 is multiplied by $$e^{j\frac{2\pi(8r+1)}{8K}}.$$

Thus, both long and short transforms can be computed with 128- or 64-point inverse FFT preceded by a pre-twiddling factor and followed by a post-twiddling factor, reducing the computational complexity as given in Table 1.

TABLE 1

| | AC-3 (long) | AC-3 (short) | MPEG |
|---|---|---|---|
| Direct | 131,072 M<br>130,560 A | 65,536 M<br>65,024 A | 2.048 M<br>1.984 A |
| Redix-2 real FFT | 2,816 M<br>3,200 A | 2,560 M<br>2,816 A | 832 M<br>1,184 A |
| Reduction Factor | 43.5 | 24.3 | 2.0 |

The 128-point FFT, which is used for the IMDCT of the Dolby AC-3 standard, can also be used for the IMDCT of the MPEG standard by modifying the IMDCT equations.

2) Modification of the MPEG IMDCT

The MPEG IMDCT is expressed as:

$$v_m(r) = \sum_{k=0}^{31} X_k(m)\cos\left\{\frac{\pi}{64}(2k+1)(r+16)\right\} \qquad \text{Equation 2a}$$

where $0 \leqq r \leqq 63$.

A new sequence is defined as follows:

$$v_m'(r) = \begin{cases} v_m(r+48), & 0 \le r \le 15 \\ v_m(r-16), & 16 \le r \le 63 \end{cases} \qquad \text{Equation 2b}$$

The original transform equation 2a can be expressed as follows using the newly defined sequence equation 2b:

$$v_{m'}(r) = \begin{cases} \sum_{k=0}^{31} X_k(m)\cos\left\{\frac{\pi}{64}(2k+1)(r+64)\right\}, & 0 \le r \le 15 \\ \sum_{k=0}^{31} X_k(m)\cos\left\{\frac{\pi}{64}(2k+1)(r)\right\}, & 16 \le r \le 63 \end{cases} \quad \text{Equation 2c}$$

The following relational expression is realized:

$$v_{m'}(32) = \sum_{k=0}^{31} X_k(m)\cos\left\{\frac{\pi}{64}(2k+1)(32)\right\} = 0 \quad \text{Equation 2d}$$

The following properties can be derived from equation 2c.

$$v_{m'}(32+j) = -v_{m'}(32-j) \text{ for } 1 \leqq j \leqq 16 \quad \text{Equation 2e}$$

$$v_{m'}(32+j) = v_{m'}(32-j) \text{ for } 17 \leqq j \leqq 31 \quad \text{Equation 2f}$$

The property expressed in equation 2e is proven by equations 2g and 2h.

If the new sequence is defined by equation 2g, it is expressed as equation 2h.

$$v''_m(r) = \begin{cases} -v_{m'}(r) \text{ for } 0 \le r \le 15 \\ v_{m'}(r) \text{ for } 16 \le r \le 31 \end{cases} \quad \text{Equation 2g}$$

$$v''_m(r) = \sum_{k=0}^{31} X_k(m)\cos\left\{\frac{\pi}{64}(2k+1)(r)\right\} \text{ for } 0 \le r \le 31 \quad \text{Equation 2h}$$

$$D(k) = \alpha(k)\sum_{n=0}^{N-1} x(n)\cos\left\{\frac{\pi}{2N}(2n+1)(k)\right\} \quad \text{Equation 2i}$$

If $k = 0$, $\alpha(k) = \sqrt{\frac{1}{N}}$.

If $k = 1, 2, \ldots N-1$, $\alpha(k) = \sqrt{\frac{2}{N}}$.

Thus, equation 2h can be computed by using equation 2i with a slight scale modification.

The vectorized representation of equation 2h is:

$$V'' = CX_k \quad \text{Equation 2j}$$

where, $C_{i,j} = \cos\left\{\frac{\pi}{64}(2j+1)(i)\right\}$

Accordingly, the vectorized representation of equation 2i is given by $D_{DCT}=ACD_N$ and the matrix A is a diagonal matrix whose elements are α(k). If equation 2j is compared with equation 2i after both sides of equation 2j are multiplied by the matrix A, the relational equation 2k is obtained.

$$AV''=ACX_k=dct(X_k) \;\therefore V''=A^{-1}dct(X_k) \quad \text{Equation 2k}$$

The result of equation 2k represents that the IMDCT of the MPEG standard given by equation 2a can be expressed by the Discrete Cosine Transform (DCT) by modifying the original inverse transform of the MPEG standard. The decoding method for performing the inverse transform using the DCT is summarized as follows:

at step 1, perform an n-point (32-point in this one) DCT of input bitstream;

at step 2, multiply the signal resulting from step 1 by the inverse matrix of A as is given in equation 2k;

at step 3, form 3, the sequence $v'_m(r)$ using equation 2g;

at step 4, expand the result of step 3 to to 2N-part (64-point) based on equations 2e and 2f; and at step 5, compute final result $v_m(r)$ using the relational equation 2b.

Thus, the FFT used for performing the IMDCT of the AC-3 standard can also be used for performing the IMDCT of the MPEG standard by investigating the relationship between DCT and DFT.

3) Relationship between the DCT and the DFT Let the input signal x(n) equal the N-point input sequence x(n) and define a new sequence y(n) as follows:

$$y(n) = \begin{cases} x(n) \text{ for } 0 \le n \le N-1 \\ x(2N-1-n) \text{ for } N \le n \le 2N-1 \end{cases} \quad \text{Equation 3a}$$

Thus, the new sequence y(n) is composed of the input sequence x(n) and a sequence wherein the input sequence x(n) is arranged in reverse order.

The relationship between the DCT and the DFT is as follows:

$$X_{DCT}(k) = \frac{\alpha(k)}{2} e^{-j\frac{\pi k}{2N}} Y_{DFT}(k) \quad \text{Equation 3b}$$

From equation 3b, it can be implied that the N-point DCT is implemented by multiplying the 2N-point DFT or FFT by a proper twiddling factor.

Therefore, the implementation of the N-point DCT using the 2N-point FFT can be summarized as follows:

at step 1, as is expressed in equation 3a, a new sequence y(n) is formed from the input sequence x(n);

at step 2, the FFT computation is performed with respect to the new sequence y(n); and at step 3, the signal resulting from step 2 is multiplied by $$e^{-j\frac{\pi k}{2N}}.$$

By performing the above-described computation, equation 3b is obtained except for the α(k) factor. The signal resulting from step 3 is not multiplied times the α(k) factor because the value of the α(k) factor is multiplied by $A^{-1}$ and thus eliminated at step 2 of the IMDCT of the MPEG standard. Thus, multiplying the signal resulting from step 3 times the α(k) factor and performing step 2 of the IMDCT of the MPEG standard can be omitted. Specifically, by multiplying the twiddling factor $$e^{-j\frac{\pi k}{2N}}$$

at step 3, V" of equation 2k is obtained. By performing steps 3 to 5 described in the IMDCT computation of the MPEG standard after performing steps 1 to 3, the desired output can be produced.

The MPEG IMDCT function using the FFT for a dual-mode audio decoder according to the present invention can be summarized as follows:

at step 1, as is expressed in equation 3a, a new sequence y(n) is formed from the input sequence x(n);

at step 2, the FFT is performed with respect to the new sequence y(n);

at step 3, V" is obtained by multiplying the result of step 2 by $e^{-j\frac{\pi k}{2N}}$;

at step 4, the sequence $V_m'(r)$ is obtained using equations 2g and 2h;

at step 5, the 32-point result of step 4 is expanded to the 64-point result based on equations 2e and 2f; and at step 6, the original sequence $V_m(r)$ is obtained using equation 2b.

The AC-3 IMDCT on the 128-point FFT is described in detail in "Multi-Channel Digital Audio Compression System," Dolby Laboratories Information, Feb. 22, 1994. The IMDCT of the AC-3 standard wherein K is equal to 512 can be implemented using the K/4-point FFT and the IMDCT of the MPEG standard can be implemented using the K/8-point FFT. Thus, only the 128-point FFT structure is needed for a dual mode audio decoder.

The IMDCT method and circuit for a dual-mode audio decoder as described above will be explained with reference to the accompanying drawings.

FIG. 1 is a flow chart of the IMDCT method for the dual-mode audio decoder according to the present invention. Referring to FIG. 1, at step 100 it is determined whether the input bit stream is an AC-3 or an MPEG bit stream. If the input bit stream is an AC-3 bit stream, a new sequence is formed from given transform coefficients $X_k(m)$ at step 110, and then the new sequence is multiplied by a pre-twiddling factor at step 120. Thereafter, an IFFT is performed using K/4-point FFT at step 130 and the result of step 130 is multiplied by a post-twiddling factor at step 140 to complete the IMDCT for the AC-3 bit stream.

If the input bit stream is an MPEG bit stream, a new sequence for the input signal is formed at step 150. That is, a new sequence is formed having a sequence with a reverse arrangement of the input signal added to the input signal. The K/8-point FFT is performed for the new sequence at step 130. The result of step 130 is multiplied by the twiddling factor $$e^{-j\frac{\pi k}{2N}}$$

at step 160. The signal resulting from the twiddling at step 160 is rearranged at step 170. The rearranging step 170 is the method for producing V from V" using the above-described equations. The K/4-point FFT module 130 serves as the main engine of the dual mode filter and subsidiary functional modules such as pre and post AC-3 twiddling or arrangement/rearrangement MPEG modules are all modeled in the previous derivations. The flow chart of FIG. 1 illustrates the above-described IMDCT method and the equations applied to the respective steps can be referred to in understanding the IMDCT method.

Figure 2:
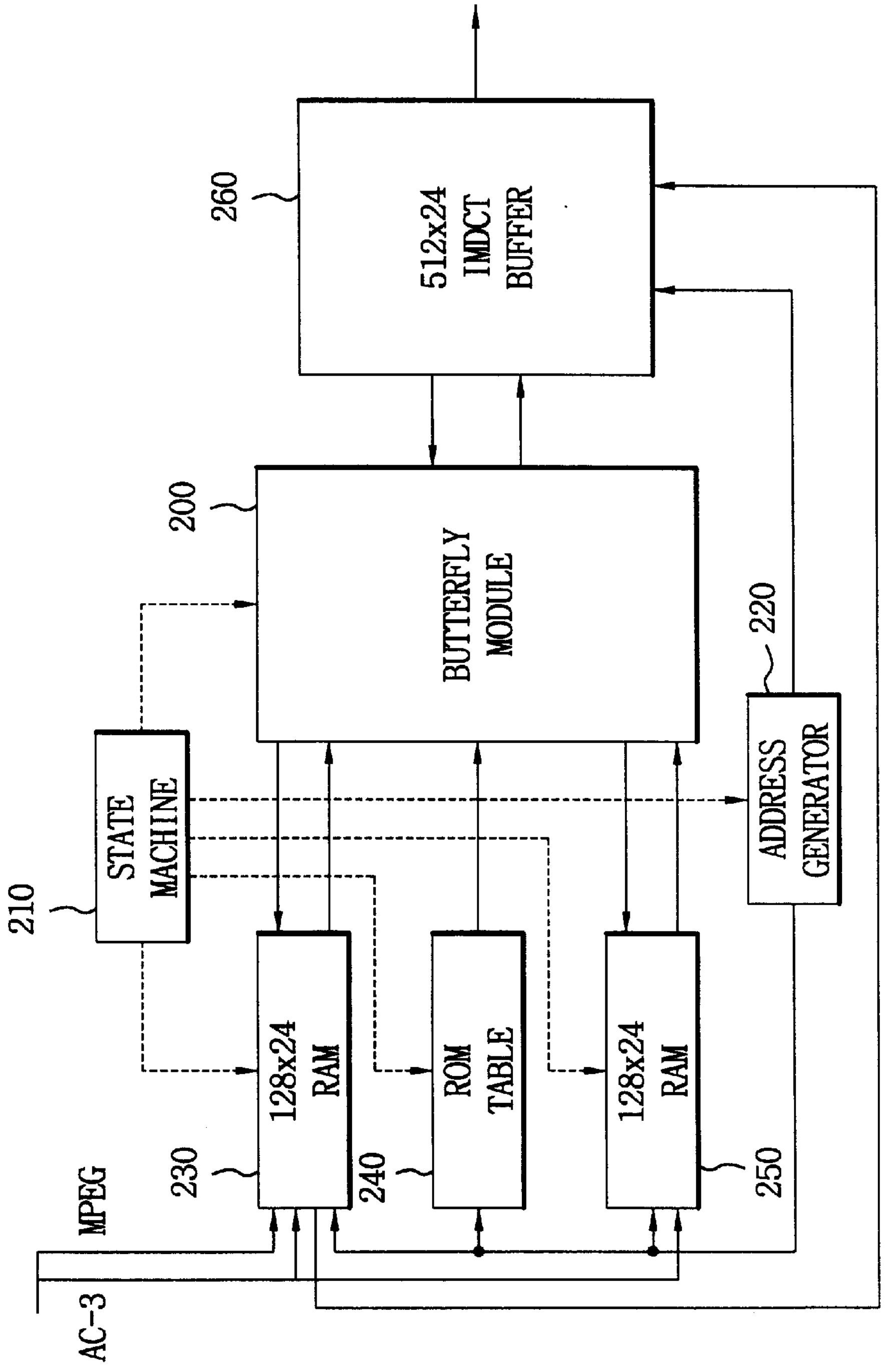
FIG. 2 is a block diagram of the IMDCT circuit for a dual-mode audio decoder according to the present invention.

FIG. 2 is a block diagram of the IMDCT circuit for a dual-mode audio decoder according to the present invention. Referring to FIG. 2, the IMDCT circuit according to the present invention includes a butterfly module 200, a state machine 210, an address generator 220, two 128×24 RAMs 230 and 250, a ROM table 240, and a 512×24 IMDCT buffer 260.

Input signals for the IMDCT circuit shown in FIG. 2 are bit streams reproduced in the frequency domain. The 512×24 IMDCT buffer 260 stores the post-twiddled output of the AC-3 bit stream and stores a 16-sample block of 32 samples of the MPEG bit stream after the IMDCT is performed. The butterfly module 200 performs pre-twiddling, post-twiddling, and 128-point IFFT where the bit stream is AC-3 data. The butterfly module 200 performs 64-point FFT and twiddling where the bit stream is MPEG data. The ROM table 240 stores therein the values of coefficients required for performing twiddling and FFT. The address generator 220 generates corresponding addresses of the RAMs 230 and 250 for the arrangement/rearrangement of the MPEG samples. The 128×24 RAM 230 stores sample values corresponding to the real part sequence among the 256 samples stored in the IMDCT buffer 260 during the IMDCT of the AC-3 bit stream and stores interim resultant values produced during the twiddling and FFT for the stored samples. Also, the 128×24 RAM 230 stores samples of real parts of the new sequence during the IMDCT of MPEG and stores interim resultant values produced during the FFT and twiddling for the stored samples and the result of rearrangement. In other words, the 128×24 RAM 230 stores interim resultant values produced during the arrangement of the samples of the real parts, FFT, twiddling, and rearrangement. The 128×24 RAM 250 stores sample values corresponding to the imaginary part sequence among the 256 samples stored in the IMDCT buffer 26 during the IMDCT of the AC-3 bit stream and stores interim resultant values produced during the twiddling and FFT for the stored samples and the result of rearrangement. Also, the 128–24 RAM 250 stores samples of imaginary parts of the new sequence during the IMDCT of the MPEG bit stream and stores interim resultant values produced during the twiddling and FFT steps. In other words, the 128–24 RAM 250 stores interim resultant values produced during the arrangement of the samples of the imaginary parts, FFT, twiddling, and rearrangement. At this time, the resultant value of the imaginary parts becomes zero after the MPEG IMDCT is performed. The state machine 210 generates control signals for controlling the respective functional blocks.

Figure 3:
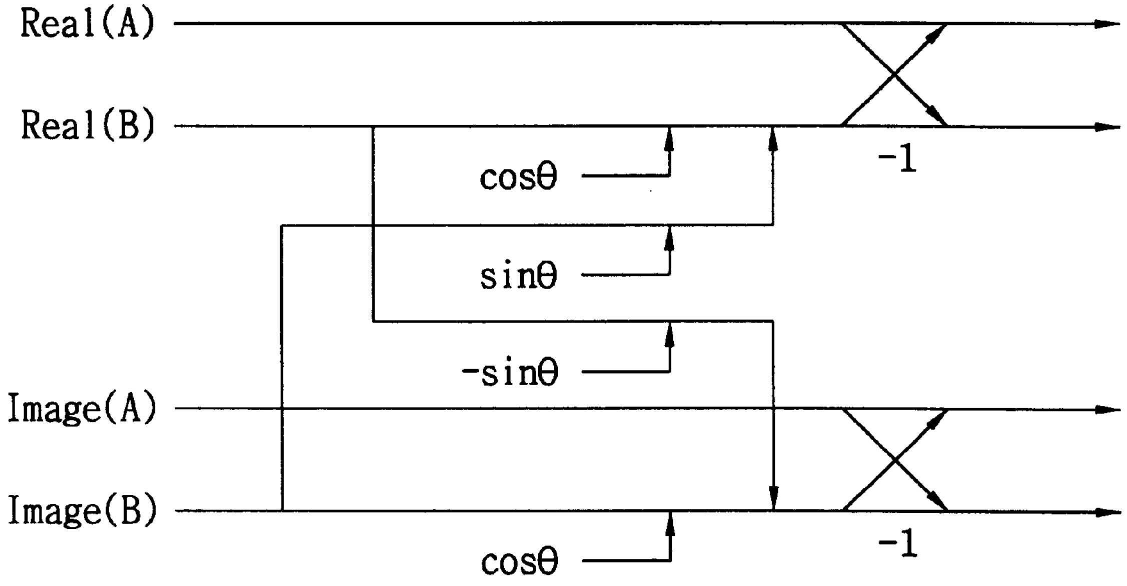
FIG. 3 is a diagram,of a radix-2 FFT butterfly for real computation of the butterfly module shown in FIG. 2.

FIG. 3 shows the structure of the butterfly of radix-2 FFT in the real region of the butterfly module 220 shown in FIG. 2. The sign of the sin θ function is changed for the IFFT case. In implementing the 128-point FFT as the radix-2 structure, 64 pairs are required with respect to each of the real parts and the imaginary parts. The structure shown in FIG. 3 requires 7 stages, and each pair requires 2 multiplications and 2 additions.

Figure 4A:
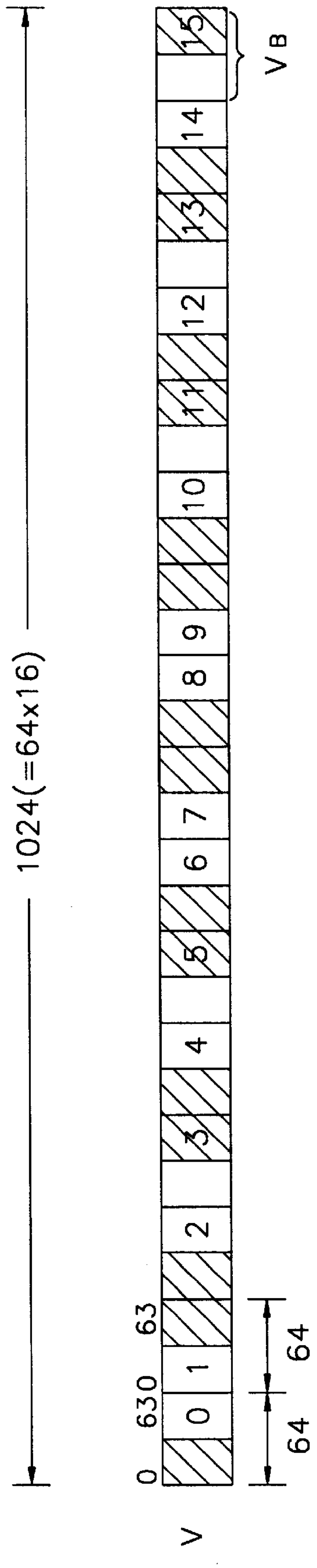
FIGS. 4*a* to 4*c* are diagrams of the V-array, window, and overlap/add operations for windowing, respectively.
Figure 4B:
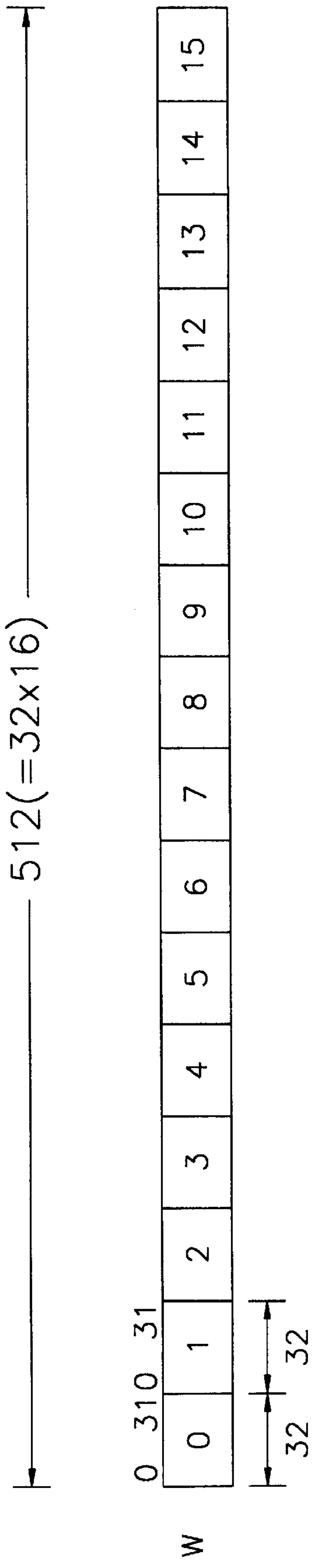
Figure 4C:
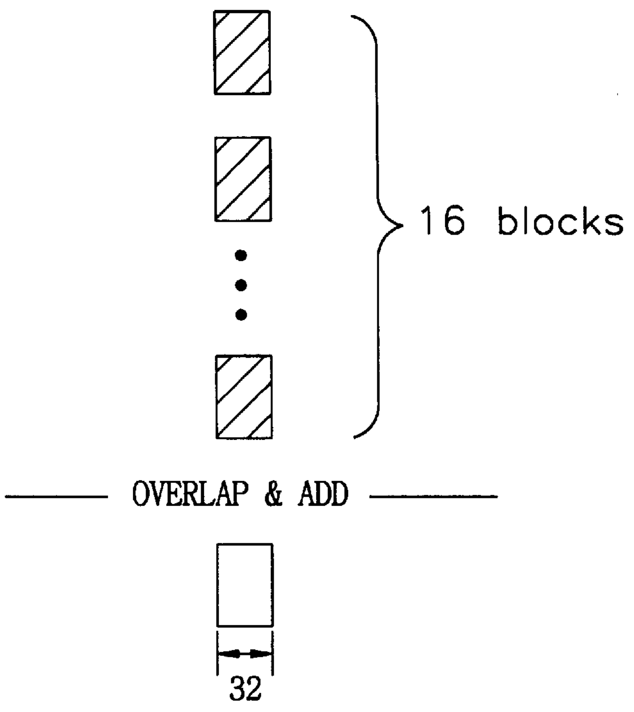

The windowing and overlap/add method for the IMDCT output data of the MPEG bit stream will be explained. A conventional windowing, and overlap/add method for the IMDCT output data of the MPEG bit stream is as follows:

In order for the dual-mode audio decoder to perform decoding of audio data, windowing is effected after the IMDCT is performed. In decoding the MPEG audio data, a V-array for storing values of IMDCT outputs for 1024 samples and thus the size of a memory for storing the IMDCT outputs should be large enough to store the 1024 samples. Specifically, the IMDCT buffer as shown in FIG. 2 should be large enough to store the 1024 samples. A synthesis window having a size of 512 is multiplied by the V-array according to the current standard. FIG. 4*a* illustrates the form of the V-array and FIG. 4*b* illustrates the form of the window. FIG. 4*c* illustrates the implementation of the MPEG audio decoder for outputting 32 samples completely reproduced.

If new 64 IMDCT outputs of a following audio block are inputted, the elements of the V-array are shifted by 64 samples to the right. The leftmost samples of the V-array are the very recently inputted samples which are indicated as a block "0" in FIG. 4*a*. The rightmost samples of the V-array are the oldest samples which are indicated as a block "15"

in FIG. 4*a*. Specifically, the numbers 0 to 15 given to the respective blocks of the V-array of FIG. 4*a* correspond to the order of data input. Each IMDCT output is composed of 64 samples, and the first 32 IMDCT outputs of even-numbered blocks 0, 2, 4, 6, 8, 10, 12, 14 of the V-array and the second 32 IMDCT outputs of odd-numbered blocks 1, 3, 5, 7, 9, 11, 13, 15 of the V-array are used for windowing. As shown in FIG. 4*b*, the synthesis window is composed of 512 coefficients and the 512 coefficients are divided into 16 blocks. Each block is composed of 32 coefficients. The window blocks are numbered 0 to 15 from left to right. The window coefficients of the even-numbered window blocks 0, 2, 4, 6, 8, 10, 12, and 14 shown in FIG. 4*b* are multiplied by the first 32 IMDCT outputs of the even-numbered blocks 0, 2, 4, 6, 8, 10, 12, 14 of the V-array, respectively, and the window coefficients of the odd-numbered window blocks 1, 3, 5, 7, 9, 11, 13, and 15 are multiplied by the second 32 IMDCT outputs of the odd-numbered blocks 1, 3, 5, 7, 9, 11, 13, 15 of the V-array, respectively. This operation is still performed even though all the elements are shifted to the right when new 64 IMDCT outputs are stored in the V-array. By the operation described above, the windowing results of the 16 blocks are obtained as shown in FIG. 4*c*. These 16 results are overlapped and added together to obtain the completely reproduced 32 samples.

According to the present invention, windowing is performed using following properties of the MPEG IMDCT output data. The properties expressed by the following mathematical equations are applied to the 64 samples of the IMDCT block.

$$v(i)=-v(32-i) \text{ for } i=0, 1, 2, \ldots, 15 \qquad \text{Equation 4a}$$

Equation 4a indicates that the progression v(i) for i=0, 1, . . . , 15 can be constructed by the progression v(i) for i=17, 18, . . . , 32, and vice versa.

$$v(16)=0 \qquad \text{Equation 4b}$$

From equation 4b, it can be understood that it is unnecessary to calculate v(16).

$$v(i)=v(96-i),\ i=33, 34, \ldots, 47 \qquad \text{Equation 4c}$$

Equation 4c indicates that the progression v(i) for i=49, 50, . . . , 63 can be constructed by the progression v(i) for i=33, 34, . . . , 47, and vice versa.

$$v(48)=-\text{sum of 32 encoded inputs} \qquad \text{Equation 4d}$$

From equation 4d, it can be understood that multiplication is not required for computing v(48).

Figure 5:
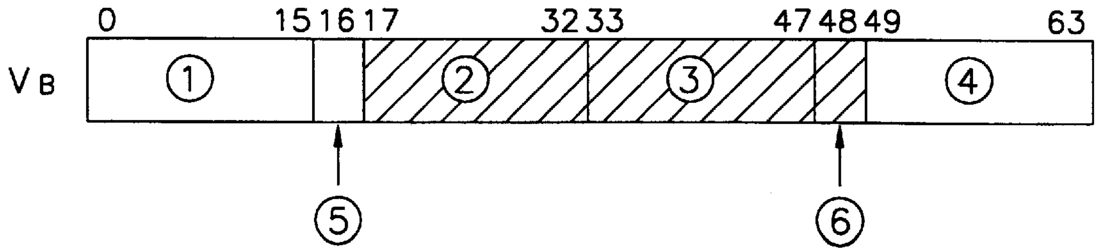
FIG. 5 is a block diagram of the block VB of the array V.

FIG. 5 is a view explaining the properties of each block $V_B$ of the array wherein the property v(i) for i=15, 14, . . . , and 0 given by equation 4a indicates a negative mirror image of v(i) for i=17, 18, . . . , and 32, and the property v(i) for i=63, 62, . . . , and 49 indicates a positive mirror image of v(i) for i=33, 34, . . . , and 47. It implies that all of the 64 samples do not have to be stored for the windowing process. In other words, the windowing and overlap/add operations can be performed by storing only representative 32 samples of v(i) for i=17, 18, . . . , and 48. Referring to FIG. 5, equation 4a indicates that the samples of portions (1) and (2) are negative images, equation 4b indicates that 17th sample represented by a portion (5) is zero, equation 4c indicates that the samples of portions (3) and (4) are positive mirror images, and equation 4d indicates that the sample of a portion (6) is a negative value of sum of the encoded 32 inputs.

It should be noted in equations 2b, 2e, 2f, and 2i that the 32 IMDCT output sequence v(i), for 17≦i≦48 corresponds to the negative value of the sequences v"(I), for I=31, 30, . . . , and 0. Accordingly, in the case of performing an IMDCT of the MPEG bit stream for a dual-mode audio decoder, only the above arrangement, FFT, and twiddling are performed without need for the rearranging step. For storing data in the IMDCT buffer shown in FIG. 2, the negative value of the sequence v"(i), for i=31, 30, . . . , 0 may be stored to perform the windowing process using this value.

Figure 6A:
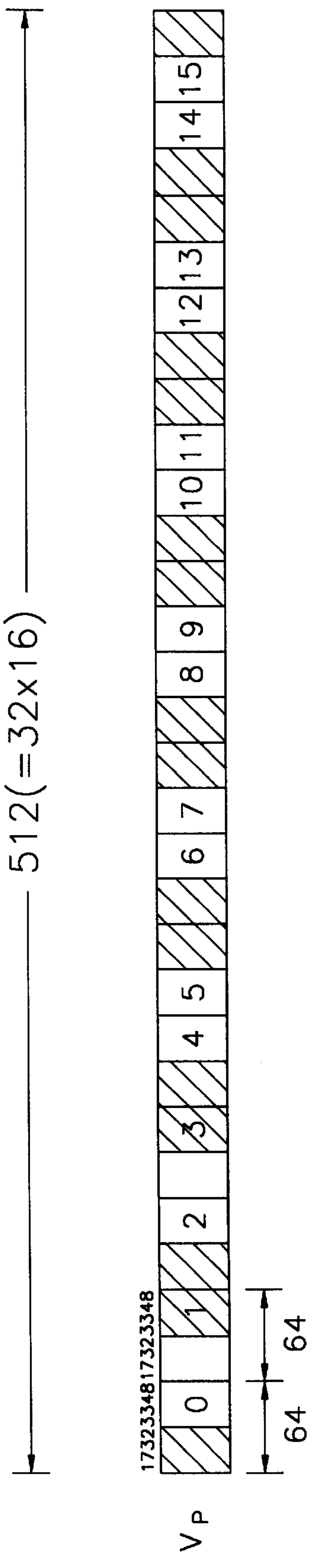
FIGS. 6*a* and 6*b* are block diagrams of the array $V_p$ and the window used in the windowing method according to the present invention.
Figure 6B:
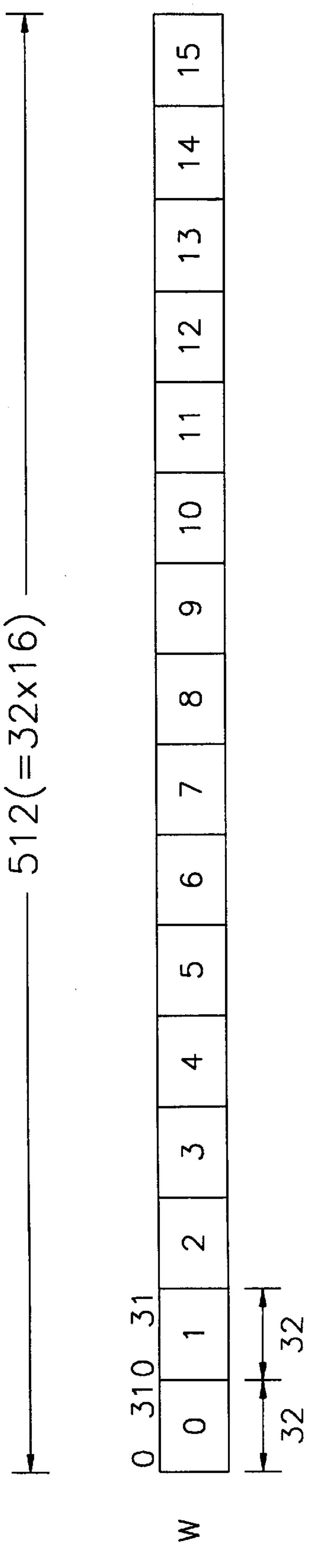

FIG. 6*a* illustrates the array $V_p$ used in the windowing method according to the present invention wherein the 17th to 48th IMDCT outputs of each block $V_B$ are stored in the array V of FIG. 4*a*. In other words, each block of the array $V_p$ is composed of 32 IMDCT outputs. Thus, the size of the IMDCT buffer shown in FIG. 2 should have the size of 1024 to store the array V shown in FIG. 4*a* but it may have the size of 512 to store the array $V_p$ shown in FIG. 5*a*. FIG. 6*b* illustrates a window similar to that shown in FIG. 4*b*. In FIG. 6*a*, the first 16 IMDCT outputs of even-numbered blocks of the array $V_p$ that are hatched and the second 16 IMDCT outputs of odd-numbered blocks of the array $V_p$ are samples to be used for windowing. Specifically, even though the values stored in the array $V_p$ may be the final outputs vs of the IMDCT computation, it is preferable that the negative values of the sequence v"(i), for i=31, 30, . . . ,and 0, are stored therein.

Figure 7A:
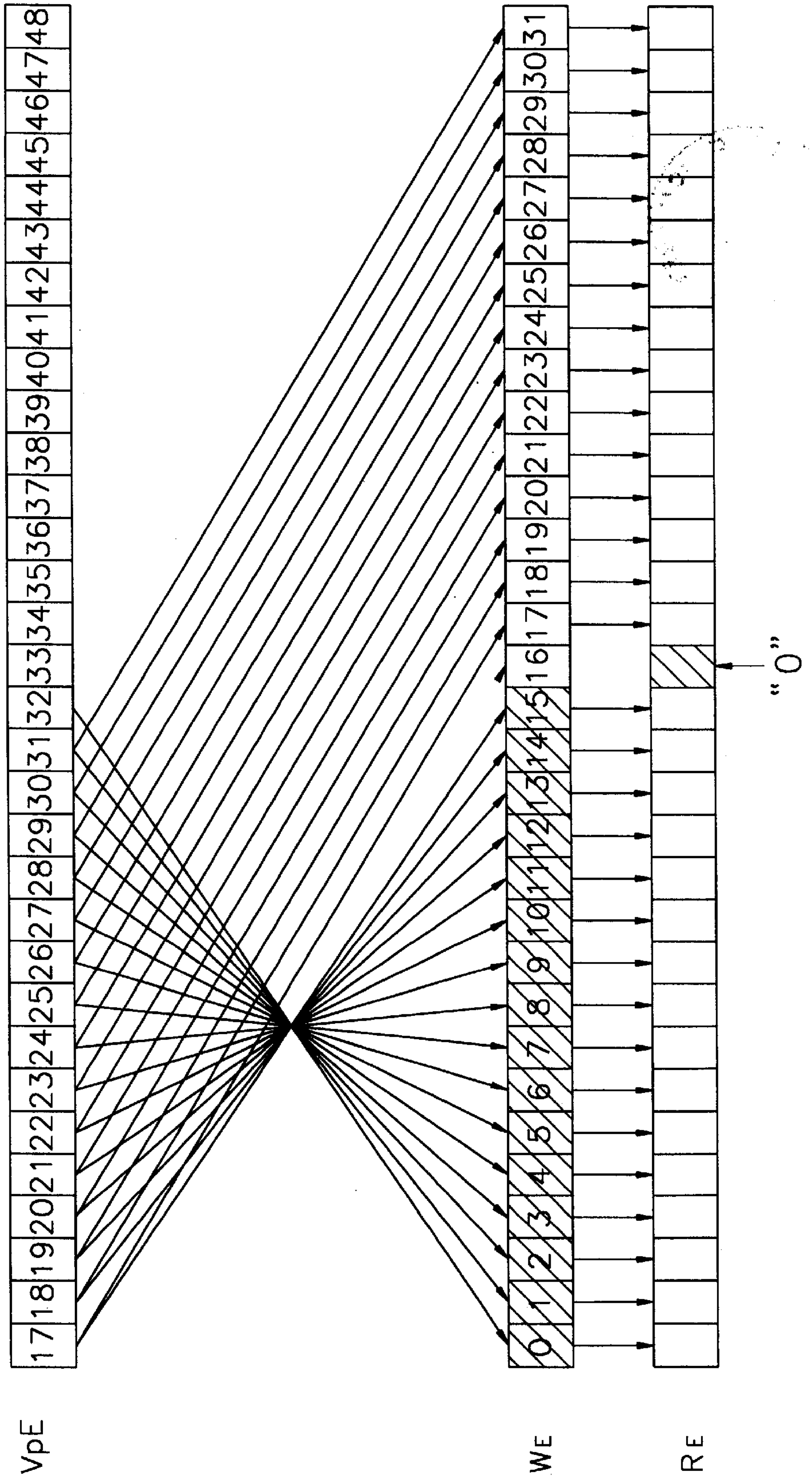
FIGS. 7*a* and 7*b* are block diagrams explaining the windowing method for a dual-mode audio decoder according to the present invention.
Figure 7B:
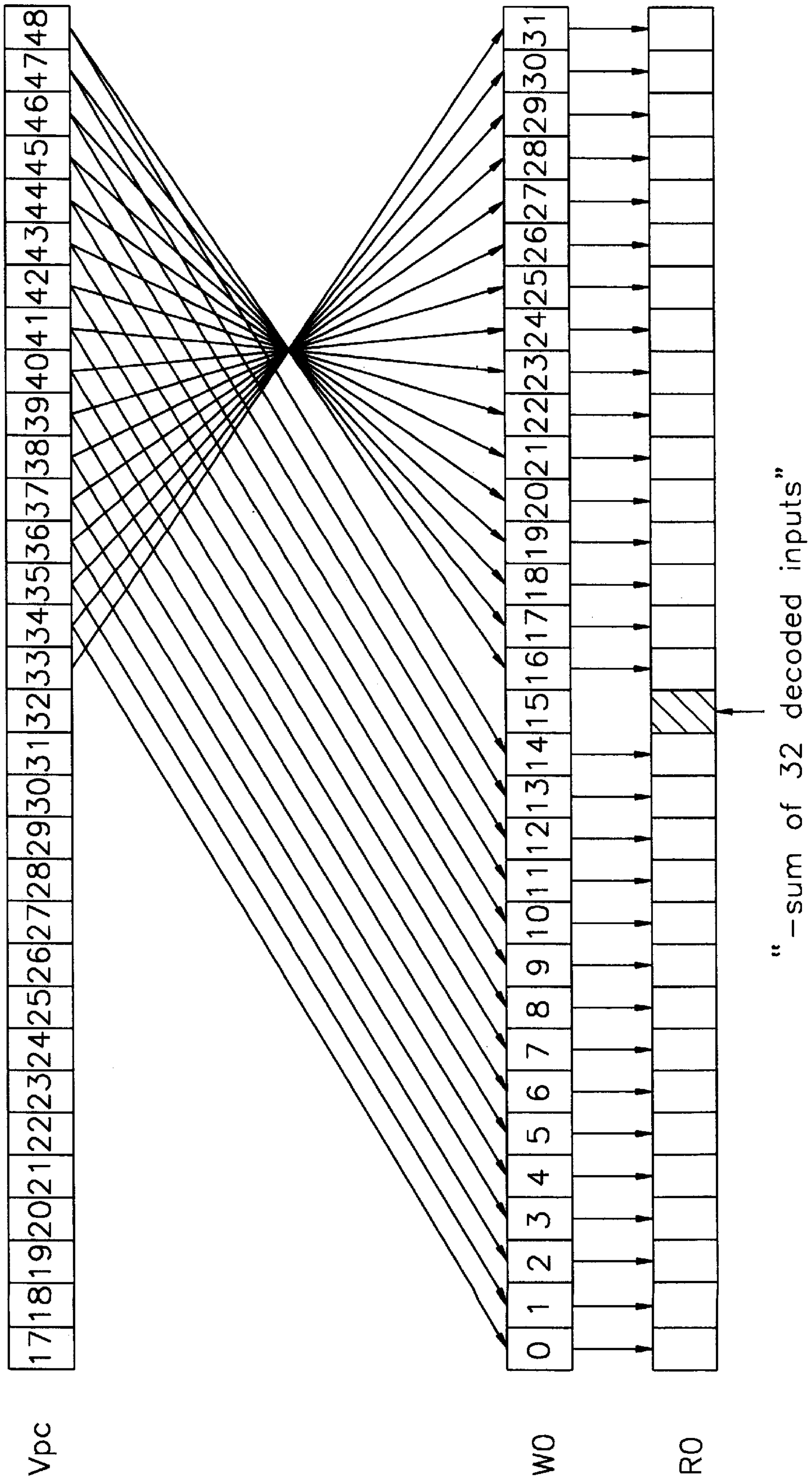

FIGS. 7*a* and 7*b* illustrate a windowing method according to the present invention. FIG. 7*a* shows the method for windowing the first 16 samples of the even-numbered blocks $V_{PE}$ (0, 2, 4, 6, 8, 10, 12, 14) of the array $V_p$ in FIG. 6*a* and the window coefficients of the even-numbered blocks $W_E$ (0, 2, . . . , 14) of the window W shown in FIG. 6*b*. FIG. 7*b* shows the method for windowing the second 16 samples of odd-numbered blocks $V_{PO}$ (1, 3, 5, 7, 9, 11*k*, 13, 15) of the array $V_p$ in FIG. 6*a* and the window coefficients of the odd-numbered blocks $W_O$ (1, 3, . . . , 15) of the window W in FIG. 6*b*.

Figure 8:
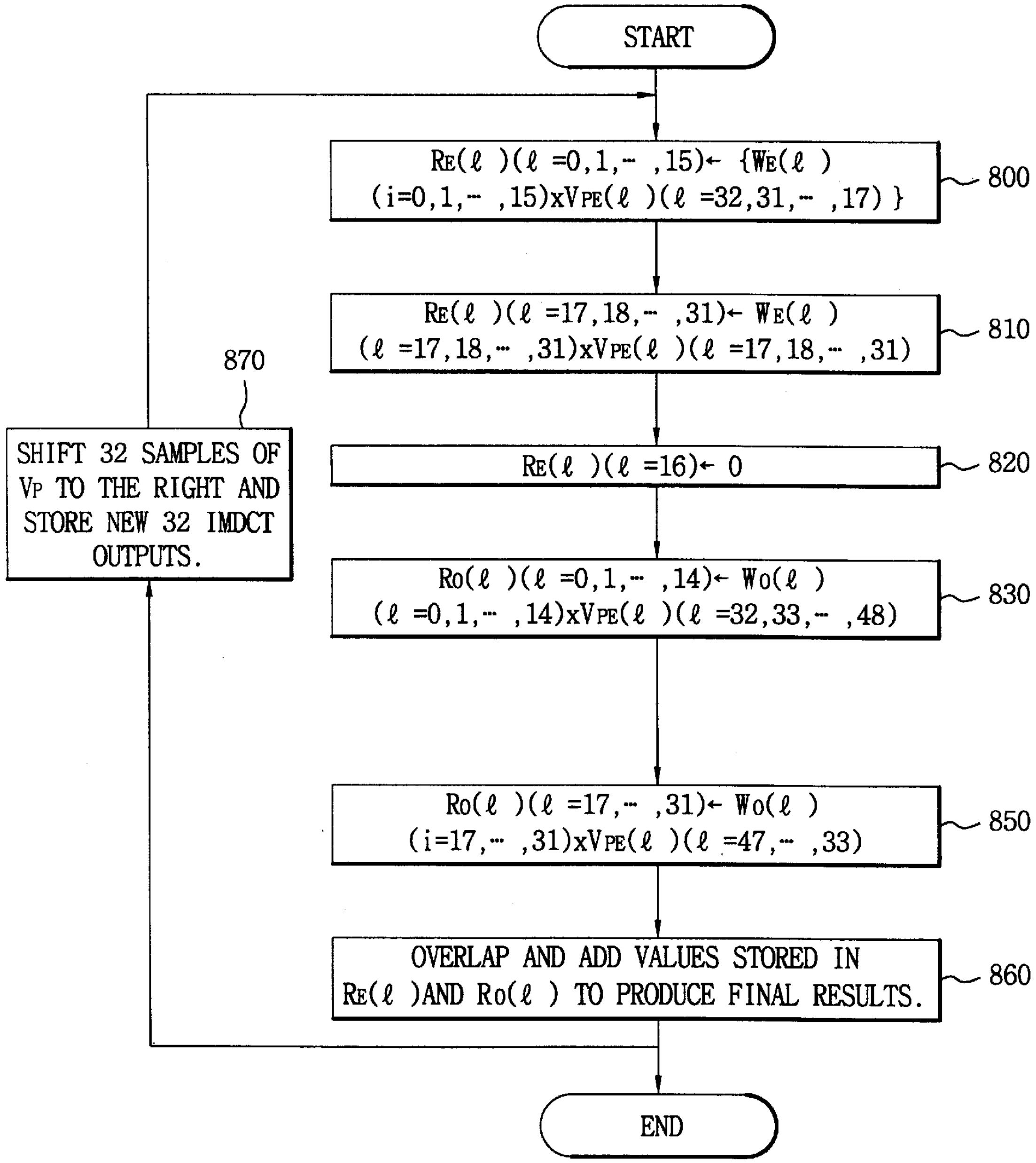
FIG. 8 is a flow chart of the windowing method for a dual-mode audio decoder according to the present invention.

FIG. 8 is a flow chart explaining the windowing and overlap/add method according to the present invention. The windowing method according to the present invention will be explained with reference to FIGS. 7*a* and 7*b*.

Referring to FIG. 7*a*, the IMDCT outputs "1" of the even-numbered blocks of the array $V_{PE}$(1) for 1=32, 31, . . . and 17 wherein denotes time domain bin numbers corresponding to IMDCT outputs, are multiplied by the window coefficients of the even-numbered blocks of the window $W_E$(1) for 1=0, 1, . . . , and 15 wherein "1" denotes bin numbers corresponding to the respective blocks. The multiplied values are negated and then the resultant values are stored in even-numbered registers $R_E$(1) for 1=0, 1, . . . , and 15 (step 800), respectively. The hatched region in FIG. 7*a* indicates that the resultant values in this region should be negated. The IMDCT outputs of the even-numbered blocks of the array $V_{PE}$(1), for 1=17, 18, . . . , and 31, are multiplied by the window coefficients of the even-numbered blocks of the window $W_E$(1), for 1=17, 18, . . . , and 31, and the resultant values are stored in the even-numbered registers $R_E$(1), for 1=17, 18, . . . , and 31 (step 810), respectively. A zero is stored in the even-numbered register $R_E$(1) for 1=16 (step 820). The IMDCT outputs of the odd-numbered blocks of the array $V_{PO}$(1), for 1=32, 33, . . . , and 48 are multiplied by the window coefficients of the odd-numbered blocks of the window $W_O$(1), for 1=0, 1, . . . , and 16, and the resultant values are stored in the odd-numbered register $R_O$(1), for 1=0, 1, . . . , and 16 (step 830), respectively. The IMDCT outputs of the odd-numbered blocks of the array $V_{PE}$(1), for

1=47, . . . , and 33 are multiplied by the window coefficients of the odd-numbered blocks of the window $W_O$(1), for 1=17, . . . , and 31 and the resultant values are stored in the odd-numbered register $R_O$(1), for 1=17, . . . , and 31 (step 850), respectively. At step 850, the resultant values of windowing for each block $V_B$ of the array $V_P$ are stored in the registers $R_E$(1) and $R_O$(1), respectively. That is, the windowing resultant values of 32 samples are stored in the 16 registers, respectively. The values in the registers are overlapped and added together to produce 32 PCM output values which are the final resultant values (step 860). After step 850, the 32 samples of the array $V_P$ are shifted to the right, and new 32 IMDCT outputs are stored (step 870). That is, whenever new 32 IMDCT outputs are inputted, the windowing and overlap/add operations are performed to produce the final 32 PCM outputs.

In the above-described embodiment, the windowing operation for the even-numbered blocks of the array $V_{PE}$ is simultaneously performed and the results of the windowing are stored in the even-numbered registers. Also, the windowing operation for the odd-numbered blocks of the array $V_{PO}$ is simultaneously performed, and the results of the windowing are stored in the odd-numbered registers. Thereafter, the resultant values in the registers are overlapped and added together to produce the final results. However, it is also possible that the-windowing operation for the odd-numbered blocks of the array is first performed and then the windowing operation for the even-numbered blocks of the array is performed. Registers for storing the computation results for the respective array blocks are separately provided, increasing the size of the registers. To ameliorate this problem, the windowing operation is consecutively preformed and the results of the windowing are stored in the registers. The results stored in the registers are then added to the resultant values produced during a subsequent windowing operation to store the interim resultant values.

According to the windowing method for a dual-mode audio decoder of the present invention, only 32 IMDCT outputs for each block may be stored for windowing by utilizing the properties of 64 IMDCT outputs for each block of the MPEG V-array, reducing memory size.

As a result, the IMDCT method and circuit for a dual-mode audio decoder according to the present invention can perform the IMDCT of the signal encoded using the MPEG and Dolby AC-3 standard by utilizing a common FFT circuit, thus reducing the necessary hardware. Also, according to the windowing method for a dual-mode audio decoder of the present invention, the number of IMDCT outputs stored for windowing is reduced by utilizing the properties of the IMDCT outputs of MPEG which in turn reduces memory size.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A windowing method for a dual-mode audio decoder, the audio decoder including an array of a first predetermined number of blocks for storing IMDCT outputs and a window comprising a second predetermined number of blocks for storing window coefficients, and storage means having a third predetermined number of blocks for storing results from applying the window to the array, the windowing method comprising:

multiplying IMDCT outputs stored in a first range of the array with coefficients stored in a first range of the window;

storing the multiplied IMDCT outputs of the first range of the array in a first range of the storage means;

multiplying IMDCT outputs stored in a second range of the array with coefficients stored in a second range of the window;

negating the multiplied IMDCT outputs of the second range of the array;

storing the multiplied negated IMDCT outputs of the second range of the array in a second range of the storage means;

multiplying IMDCT outputs stored in a third range of the array with coefficients stored in a third range of the window;

storing the multiplied IMDCT outputs of the third range of the array in a third range of the storage means;

multiplying IMDCT outputs stored in a fourth range of the array with coefficients stored in a fourth range of the window;

storing the multiplied IMDCT outputs of the fourth range of the array in a fourth range of the storage means;

shifting the array to the right by one block;

inputting new IMDCT outputs for the shifted block of the array; and producing resultant values by overlapping and adding the multiplied ranges of IMDCT outputs stored in the storage means.

2. The method of claim 1 including storing a zero in each 16th position of even numbered blocks of the storage means.

3. The method of claim 1 wherein the first predetermined number of blocks is 16, the second predetermined number of blocks is 16, and the third predetermined number of blocks is 16.

4. The method of claim 1 wherein the first range of the array are 17th to 32nd bins of even numbered blocks of the array, the second range of the array are 17th to 31st bins of the even numbered blocks of the array, the third range of the array are 32nd to 48th bins of odd numbered blocks of the array, and the fourth range of the array are 33rd to 47th bins of the odd numbered blocks of the array.

5. The method of claim 4 wherein the coefficients stored in the first range of the window are 0th to 15th window coefficients of even numbered blocks of the window, the coefficients stored in the second range of the are 17th to 31st window coefficients of the even numbered blocks of the window, the coefficients stored in the third range of the window are 32nd to 48th window coefficients of odd numbered blocks of the window, and the coefficients stored in the fourth range of the window are 33rd to 47th window coefficients of the odd numbered blocks of the window.

* * * * *

UNITED STATES PATENT AND TRADEMARK OFFICE

CERTIFICATE OF CORRECTION

PATENT NO. : 6,209,015 B1
DATED : March 27, 2001
INVENTOR(S) : Jhung

It is certified that error appears in the above-identified patent and that said Letters Patent is hereby corrected as shown below:

Column 1,
Line 58, "widow blocks" should read -- window blocks --.

Column 2,
Line 64, "thid storage" should read -- third storage --.

Column 5,
Line 53,

"$e^{j\frac{2\pi(8k+1)}{8K}}$" should read -- $e^{j\frac{2\pi(8r+1)}{8K}}$ --.

Column 6,
Line 6,

"$\sum_{r=0}^{K/4-1}\left[\left\{s_m(r)e^{-j2\frac{\pi(8r+1)}{8K}}\right\}e^{j2\pi\frac{kr}{K/4}}\right]e^{-j2\frac{\pi(8k+1)}{8K}}$" should read -- $\sum_{r=0}^{K/4-1}\left[\left\{s_m(r)e^{-j\frac{2\pi(8r+1)}{8K}}\right\}e^{j\frac{2\pi kr}{K/4}}\right]e^{-j\frac{2\pi(8r+1)}{8K}}$ --.

Column 10,
Line 23, "buffer 26" should read -- buffer 260 --.

Column 14,
Line 54, "range of the are $17^{th}$" should read -- range are $17^{th}$ --

Signed and Sealed this

Fourteenth Day of May, 2002

*Attest:*

JAMES E. ROGAN
*Director of the United States Patent and Trademark Office*

*Attesting Officer*